United States Patent
Mryasov et al.

(10) Patent No.: US 9,886,977 B1
(45) Date of Patent: Feb. 6, 2018

(54) DUAL CAP LAYERS FOR HEAT-ASSISTED MAGNETIC RECORDING MEDIA

(71) Applicants: Western Digital Technologies, Inc., Irvine, CA (US); Western Digital Technologies, Inc., Irvine, CA (US)

(72) Inventors: Oleg Mryasov, Cupertino, CA (US); Alan Kalitsov, San Jose, CA (US); Hoan Ho, San Jose, CA (US); Paul Dorsey, Los Altos, CA (US); Gerardo Bertero, Redwood City, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/389,432

(22) Filed: Dec. 22, 2016

(51) Int. Cl.
| | |
|---|---|
| *G11B 5/72* | (2006.01) |
| *G11B 5/667* | (2006.01) |
| *G11B 5/725* | (2006.01) |
| *G11B 5/65* | (2006.01) |
| *G11B 5/851* | (2006.01) |
| *G11B 5/00* | (2006.01) |

(52) U.S. Cl.
CPC .............. *G11B 5/667* (2013.01); *G11B 5/656* (2013.01); *G11B 5/725* (2013.01); *G11B 5/851* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 4,525,412 A | 6/1985 | Nakane et al. | |
| 4,536,444 A | 8/1985 | Sumiya et al. | |
| 5,134,288 A | 7/1992 | Van Dijck | |
| 5,777,973 A | 7/1998 | Yoo et al. | |
| 6,007,623 A | 12/1999 | Thiele et al. | |
| 6,086,974 A | 7/2000 | Thiele et al. | |
| 6,352,765 B1 * | 3/2002 | Iwata | G11B 11/10515 360/53 |
| 7,313,015 B2 | 12/2007 | Bessho | |
| 8,658,292 B1 | 2/2014 | Mallary et al. | |

(Continued)

FOREIGN PATENT DOCUMENTS

JP 11306608 A * 11/1999

OTHER PUBLICATIONS

"Thermomagnetic Recording Medium for a Direct-Overwrite Recording System," IBM Technical Disclosure Bulletin, Sep. 1, 1989, vol. No. 32, Issue No. 4A, p. No. 384-386.*

(Continued)

*Primary Examiner* — Will J Klimowicz
(74) *Attorney, Agent, or Firm* — John D. Henkhaus

(57) ABSTRACT

A recording medium having improved signal-to-noise ratio (SNR) capabilities includes dual cap layers over the recording layer, where the Curie temperature of the first cap layer over the recording layer is greater than the Curie temperature of the recording layer, and the Curie temperature of the second cap layer over the first cap layer is greater than the Curie temperature of the first cap layer. The first cap layer may be composed of a magnetically hard material, such as $L1_0$ CoPt, where the second cap layer may be composed of a magnetically soft material, such as Co. Such a medium is particularly useful in the context of heat-assisted magnetic recording (HAMR).

18 Claims, 2 Drawing Sheets

(56) References Cited

U.S. PATENT DOCUMENTS

| | | | |
|---|---|---|---|
| 8,743,666 B1 * | 6/2014 | Bertero | G11B 5/66 369/13.06 |
| 8,947,987 B1 | 2/2015 | Wang et al. | |
| 9,001,630 B1 * | 4/2015 | Bertero | G11B 5/66 369/13.06 |
| 9,159,350 B1 | 10/2015 | Wang et al. | |
| 9,275,669 B1 * | 3/2016 | Girgis | G11B 5/73 |
| 2001/0028625 A1 | 10/2001 | Asada et al. | |
| 2002/0071377 A1 | 6/2002 | Ogata | |
| 2007/0171575 A1 | 7/2007 | Lim et al. | |
| 2010/0020324 A1 | 1/2010 | Uchida | |
| 2010/0065935 A1 | 3/2010 | Horng et al. | |
| 2010/0073813 A1 | 3/2010 | Dai et al. | |
| 2013/0016591 A1 | 1/2013 | Tomikawa et al. | |
| 2014/0085753 A1 | 3/2014 | Nagasaka et al. | |
| 2014/0175581 A1 | 6/2014 | Guo | |
| 2015/0091110 A1 | 4/2015 | Kuo et al. | |

OTHER PUBLICATIONS

"Overwritable Exchange Coupled Five Layer Magneto-optic Medium," IBM Technical Disclosure Bulletin, Dec. 1, 1991, vol. No. 34 Issue No. 7A p. No. 154-155.*

Englsih-machine Translation of JP 11-306608A to Ikeda, published on Nov. 5, 1999.*

Y. Inaba et al., Thermal stability and recording writability of hard/soft stacked perpendicular media, Journal of Applied Physics, presented on Nov. 1, 2005; published online Apr. 28, 2006, 3 pages, vol. 99, 08G913, American Institute of Physics.

Dustin A. Gilbert et al., Magnetic Yoking and Tunable Interactions in FePt-Based Hard/Soft Bilayers, pp. 1-24 + 1-3.

H. Jung et al., Comparison of media properties between hard/soft stacked composite and capping layer perpendicular recording media, Journal of Magnetism and Magnetic Materials, available online Aug. 19, 2008, pp. 3151-3156, vol. 320, Elsevier B.V.

Y. Inaba et al., Preliminary study on (CoPtCr/NiFe)-SiO/sub 2/hard/soft-stacked perpendicular recording media (Abstract), IEEE Transactions on Magnetics, Oct. 17, 2005; pp. 3136-3138, vol. 41, Issue 10, IEEE.

Dustin A. Gilbert et al., Magnetic Yoking and Tunable Interactions in FePt-Based Hard/Soft Bilayers, received Jun. 14, 2016, accepted Aug. 16, 2016, published online Sep. 8, 2016; pp. 1-24 + 1-3 of Supplementary formation; Scientific Reports 6, Article No. 32842, nature.com.

* cited by examiner

DUAL CAP LAYERS FOR HEAT-ASSISTED MAGNETIC RECORDING MEDIA

FIELD OF EMBODIMENTS

Embodiments of the invention may relate generally to data storage devices and, more particularly, to heat-assisted magnetic recording (HAMR) media.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Increasing areal density (a measure of the quantity of information bits that can be stored on a given area of disk surface) is one of the ever-present goals of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Heat-assisted magnetic recording (HAMR) is a technology that magnetically records data on high-stability media using, for example, laser thermal assistance to first heat the media material. HAMR takes advantage of high-stability, high coercivity magnetic compounds, such as iron platinum alloy, which can store single bits in a much smaller area without being limited by the same superparamagnetic effect that limits the current technology used in hard disk drive storage. However, at some capacity point the bit size is so small and the coercivity correspondingly so high that the magnetic field used for writing data cannot be made strong enough to permanently affect the data and data can no longer be written to the disk. HAMR solves this problem by temporarily and locally changing the coercivity of the magnetic storage medium by raising the temperature near the Curie temperature, at which the medium effectively loses coercivity and a realistically achievable magnetic write field can write data to the medium.

In order to improve the recording performance for magnetic recording media, including HAMR media, it is desirable to increase the SNR (Signal-to-Noise Ratio) through structure design and materials selections.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a recording medium having dual cap layers over the magnetic recording layers are described. In the following description, for the purposes of explanation, numerous specific details are set forth in order to provide a thorough understanding of the embodiments described herein. It will be apparent, however, that the embodiments described herein may be practiced without these specific details. In other instances, well-known structures and devices are shown in block diagram form in order to avoid unnecessarily obscuring the embodiments described herein.

Physical Description of an Illustrative Operating Context

Embodiments may be used in the context of a heat-assisted magnetic recording (HAMR) medium in a hard-disk drive (HDD) data storage device. Thus, in accordance with an embodiment, a plan view illustrating an HDD 100 is shown in FIG. 1 to illustrate an examplary operating environment.

Figure 1:
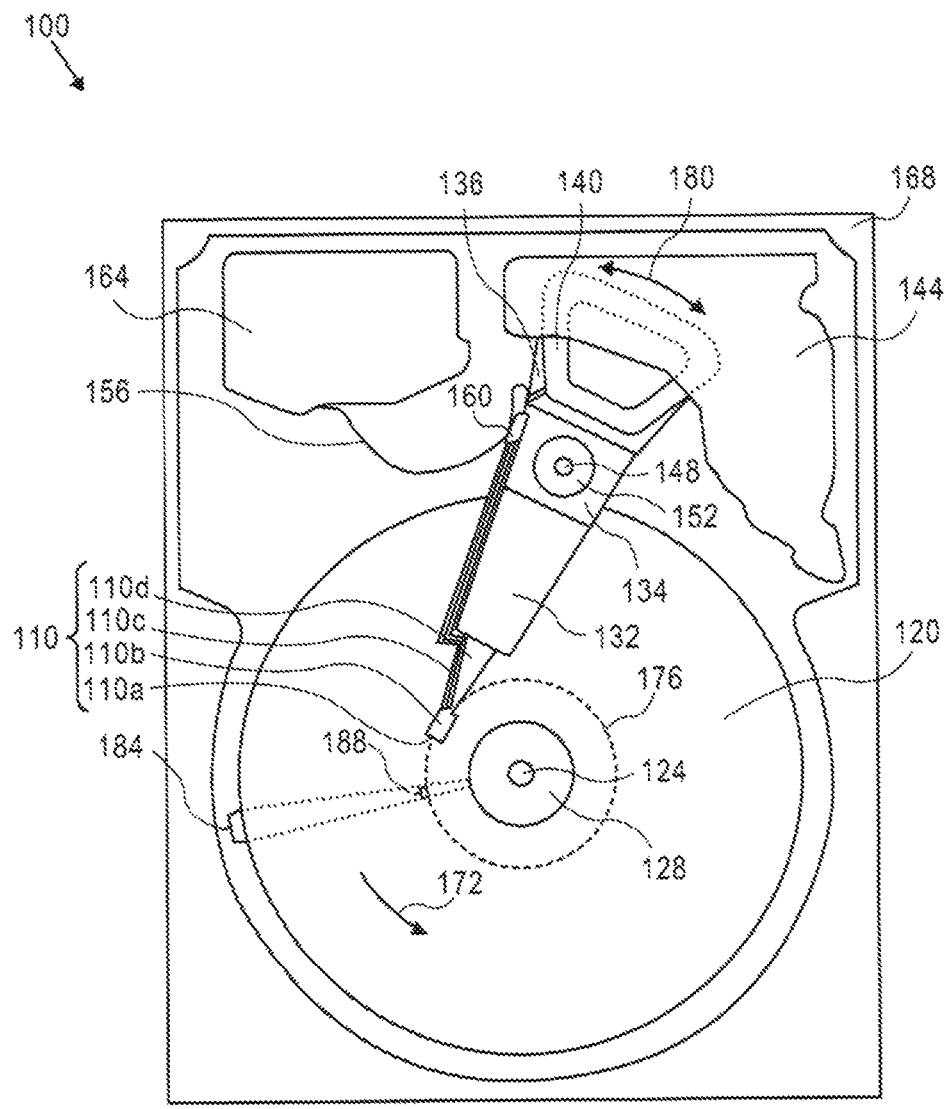
FIG. 1 is a plan view illustrating a hard disk drive, according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

Heat-assisted magnetic recording (HAMR) technology that utilizes $L1_0$ FePt based alloys has been widely investigated for use in hard disk drive media. As mentioned, increasing the SNR of media, including HAMR media, improves the recording performance. One approach to a media structure for HAMR applications consists of adhesion, intermediate, magnetic, overcoat and lubricant layers, all stacked on a substrate. To improve the recording performance of HAMR media, particularly media SNR and jitter, media structure design and material selection is an area of interest. For example, areas of research have involved media structure design and material selection relating to the magnetic layer, the intermediate layer (e.g., the seed layer, underlayer, heat sink), etc.

Generally, a high enough magnetic field is needed to saturate the magnetic recording media during the write process. Use of a capping (or "cap") layer of magnetically soft material(s) may substantially improve signal to noise ratio (SNR) in HAMR media. Cap layers increase effective Zeeman energy (e.g., the potential energy of a magnetized body in an external magnetic field) of FePt grains at elevated temperatures, thereby improving their alignment along the head field during the writing process. In addition, a cap layer increases the overall saturation magnetization of the magnetic recording medium and, therefore, enhances the read signal. However, greater Zeeman energy may lead to an undesirable transition-broadening-after-write effect that can occur when the write head field direction is reversed. Stated otherwise, the greater Zeeman energy may lead to a higher probability that the magnetization of a bit reverses when writing the next or subsequent bits. Thus, a viable approach to reducing the transition-broadening-after-write effect is noteworthy.

Dual Cap Layers for Heat-Assisted Magnetic Recording (HAMR) Media

Figure 2:
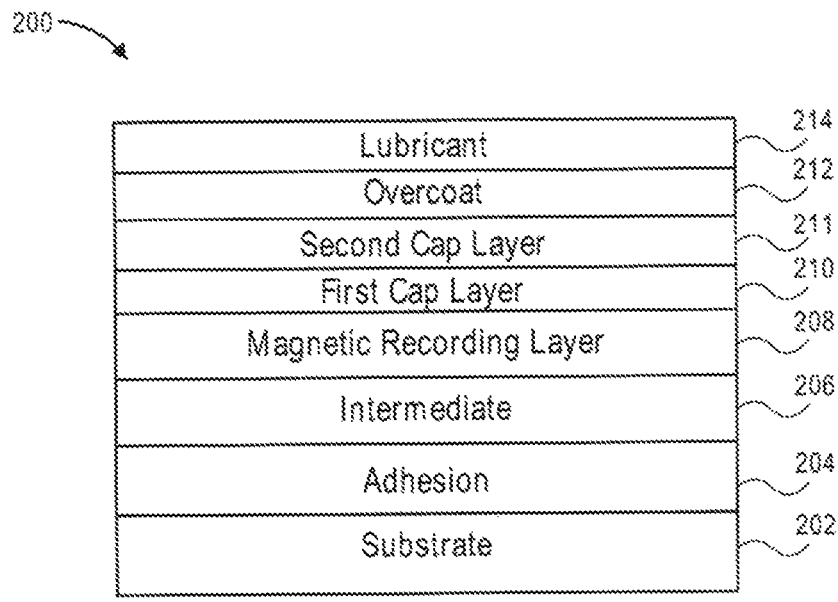
FIG. 2 illustrates a magnetic recording medium stack having dual cap layers, according to an embodiment.

FIG. 2 illustrates a magnetic recording medium stack having dual cap layers, according to an embodiment. The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Reference herein to a "layer" is not intended to be thereby limited to a single layer, rather each "layer" referenced may actually comprise multiple layers, or a "stack" of thin film layers. Further, the terms "fabricated" and "formed" may include any of a number of thin film processes, such as chemical and/or physical deposition processes (of which sputtering is commonly used in hard disk media production), which "grow" grains of poly-crystalline thin films, for example, as well as promote crystalline epitaxial growth, and the like. Therefore, use of these terms and related terms do not limit to any particular process, unless otherwise indicated.

The medium 200 includes a stacked structure with a bottom substrate 202, an adhesion layer 204 over the substrate 202, an intermediate layer 206 over the adhesion layer 204, a magnetic recording layer 208 over the intermediate layer 206, a first cap layer 210 over the magnetic recording layer 208, a second cap layer 211 over the first cap layer 210, an overcoat layer 212 over the second cap layer 211, and a lubricant layer 214 over the overcoat layer 212, according to embodiments.

According to an embodiment, the magnetic recording layer 208 may comprise a FePt based material. For example, the magnetic recording layer 208 may include FePt or any suitable FePt alloys (e.g., $L1_0$ FePt).

According to an embodiment, the Curie temperature ($T_c$) of the first cap layer 210 material is greater than the Curie temperature of the magnetic recording layer 208 material, and the Curie temperature of the second cap layer 211 material is greater than the Curie temperature of the first cap layer 210 material. Thus, the first cap layer 210 can maintain finite magnetic anisotropy at temperatures at which the magnetic anisotropy of the magnetic recording layer 208 vanishes. The Curie temperature (or "Curie point") refers to the temperature at which certain materials lose their permanent magnetization (e.g., having a persistent magnetic field), to be replaced with induced magnetism (e.g., induced magnetic dipole moments in a magnetic material). "Magnetic anisotropy" generally refers to the directional dependence of a material's magnetic properties, and is simply referred to as "anisotropy" elsewhere herein.

To compare media performance differences, a HAMR recording process is simulated with the following procedure, whereby calculations are based on atomistic Langevin dynamics simulations of a single media grain, for a non-limiting example. As the first step, the atomic spin structure of the grain at a temperature above the Curie temperature of the magnetic recording layer (e.g., magnetic recording layer 208) is found by the Monte Carlo method. After that a grain with this initial atomic spin structure is placed under an external magnetic field and cooled down to temperatures below the refreeze temperature ($T_f$), with the cooling rate corresponding to a HAMR process. After a certain time, the direction of the head field reverses, where this reversal corresponds to next bit writing. Thus, one should ensure that by this time the grain magnetization is already "frozen" to avoid undesirable transition-broadening-after-write. The probability that a grain's magnetization is aligned along the head field at different instances of time during the cooling process is calculated.

Probabilities of magnetizations aligned along the head field for several switching times were calculated. When the switching time is short, the grain temperature is still high and thus there exists a finite probability that the magnetization of a grain points in the direction opposite to the external field. With a media stack having no cap layer, at around the switching time, the anisotropy of the magnetic recording layer 208 (e.g., FePt) may be negligible at elevated temperatures and the Zeeman energy is not sufficient to align the magnetization along the head field. However, with a media stack having only a magnetically soft cap layer, such as second cap layer 211, the foregoing issue significantly improves because the soft cap layer with high Curie temperature significantly increases Zeeman energy at high temperatures. Thus, the role of a single layer cap can be viewed as effective increase of the head field. This effect, however, may have a negative impact on HAMR media performance when the writing head field direction reverses. At switching time, the magnetic recording layer 208 (again, e.g., FePt) anisotropy might still be insufficient to hold the magnetization and it may follow the direction of the head field, leading to undesirable transition-broadening-after-write.

Therefore, according to an embodiment, the cap consists of combination of magnetically hard and soft layers, such as first cap layer 210 and second cap layer 211, respectively. A "hard" magnetic material (or "magnetically hard material") generally refers to a material that retains its magnetism, even after the removal of an applied magnetic field, and is thus relatively difficult to demagnetize. With magnetically hard materials, the magnetic anisotropy is relatively large, which provides for maintaining the magnetization in a certain direction, i.e., high retentivity. A "soft" (or "magnetically soft") magnetic material generally refers to materials that are relatively easy to magnetize and demagnetize, with relatively low retentivity. While the role of the soft layer (second cap layer 211) is to increase Zeeman energy, the purpose of the hard layer (first cap layer 210) is to increase anisotropy of grains at elevated temperatures. At elevated temperatures, the magnetization of the magnetic recording layer 208 is relatively small, yielding insufficient grain anisotropy, leading to transition-broadening-after-write. Thus, use of a hard cap layer 210 with the Curie point above the Curie point of the magnetic recording layer 208 effectively increases the grain anisotropy at elevated temperatures. As the result, the alignment of magnetization during the cooling process in the external field improves, and undesirable magnetization reversal after the head field direction reverses reduces. This was the case for most if not all simulated reversal times. Thus, the use of a magnetically soft layer (e.g., second cap layer 211) increases effective Zeeman energy, yielding improvement of the grain's magnetization alignment during the write process, while use of a magnetically hard layer (e.g., first cap layer 210) assists in reducing the transition-broadening-after-write effect. Furthermore, such a dual-layer hard/soft cap combination may tolerate a cap with a thicker soft layer, which may be beneficial for the read signal.

According to an embodiment, the first cap layer 210 comprises a CoPt material. According to a related embodiment, the first cap layer 210 comprises a $L1_0$ CoPt material, that is, a CoPt material having a $L1_0$ crystalline structure. An $L1_0$ CoPt structure is considered to more readily grow on an $L1_0$ FePt magnetic recording layer 208. According to embodiments, the second cap layer 211 comprises Co, and may consist solely of Co. As discussed, the magnetic anisotropy of magnetically hard materials is relatively large. Magnetic anisotropy, in turn, originates from the spin-orbit coupling. Intrinsic spin-orbit coupling, and thus magnetic anisotropy, is large in heavy elements such as Pt but it is rather weak in Co and Fe. Hence, FePt and CoPt are considered magnetically hard while Fe and Co are considered magnetically soft.

CoPt, generally, and $L1_0$ CoPt, specifically, are good candidates for the magnetically hard first cap layer 210, with $L1_0$ CoPt having a Curie temperature 90 K above the Curie temperature of FePt (840 K for $L1_0$ CoPt vs. 750 K for FePt), a commonly used magnetic recording layer for magnetic recording layer 208 of a HAMR medium such as medium 200. The saturation magnetization ($M_s$, emu/cm$^3$) and uniaxial magnetic anisotropy values ($K_u$, $10^7$ erg/cm$^3$) in CoPt are about 30% lower compared to these values in FePt at room temperature ($M_s$ of 800 for $L1_0$ CoPt vs. 1140 for FePt; $K_u$ of 4.9 for $L1_0$ CoPt vs. 7 for FePt), however, at elevated temperatures close to the Curie temperature of FePt, these properties for $L1_0$ CoPt are still significant. Furthermore, cross-section TEM images of a part of a magnetic stack show well-ordered $L1_0$ CoPt layer on top of $L1_0$ FePt grain, confirming that CoPt is epitaxially grown suitably well on FePt, with effectively no or negligent intermixing between CoPt and FePt.

Use of Co-rich CoPt structures may further enhance the Curie temperature and saturation magnetization of CoPt. Thus, according to an embodiment, the first cap layer 210 comprises CoPt having an amount of Pt in a range of 40-60 atomic percent (at %), thereby remaining in the $L1_0$ structural regime. For a non-limiting example, a $Co_{55}Pt_{45}$ structure has a Curie temperature and saturation magnetization found to be suitable for purposes described herein.

Comparing performance of a HAMR media stack (e.g., medium 200) with a HAMR media stack having only a soft second cap layer 211 (i.e., absent a first cap layer 210) such as Co, has shown an SNR performance improvement of around 0.5 dB up to about 1.0 dB, and a reduction in jitter of around 3.8%, for non-limiting examples. Different sputtering temperatures (e.g., T=550° C. and T=650° C.) allow some control of the order parameter and strength of uniaxial anisotropy in CoPt (e.g., first cap layer 210). Additionally, varying the sputtering duration of the CoPt cap may be employed to fabricate media with different CoPt cap thicknesses.

Materials other than CoPt may also be suitable for use for purposes described herein, where the crystal structure of such alloys provide the desired magnetic properties, such as high magnetic anisotropy and high Curie temperature. According to an embodiment, the first cap layer comprises a material selected from a group consisting of $L1_0$ CoPt, $L1_0$ FePd, and hexagonal close-packed (hcp) $Co_3Pt$. The foregoing materials have relatively high respective saturation magnetization, and suitable respective Curie temperature in comparison with a FePt-based magnetic recording layer 208.

As described, the addition of the hard first cap layer 210 can enable an increase in the SNR of the magnetic recording layer 208, at least in part by improving/increasing the magnetic anisotropy of the medium 200 at particular, desirable write temperatures (e.g., the write temperature for a FePt-based magnetic recording layer). The medium 200 described in reference to FIG. 2 is well-suited for use in hard disk drive (HDD) heat-assisted magnetic recording (HAMR) systems, wherein individual magnetic recording bit size and overall areal density are significant design goals. However, other types of energy-assisted media and "traditional" media (e.g., perpendicular magnetic recording, or PMR) based systems may also benefit from the use of dual cap layers in the respective media types.

To further improve the recording performance of the medium 200, especially media SNR, various suitable media designs and material selections may be used. According to an embodiment, the substrate 202 may include a material selected from a group including an Al alloy, NiP plated Al, glass, glass ceramic, and combinations thereof. Further, and according to an embodiment, the adhesion layer 204 may include a material selected from a group including CrTi, CrTa, NiTa, CoCrTaZr, CoFeZrBCr, CoTaZr, CoFeTaZr, CoCrWTaZr, CoCrMoTaZr, CoZrWMo, and combinations thereof. Further still, and according to an embodiment, the intermediate layer 206 may include various functional layers (for non-limiting examples: seed layer, heat sink layer, underlayer, etc.) including Cr, Mo, Ru, RuAl, MgO, W, CuZr, MoCu, AgPd, CrRu, CrV, CrW, CrMo, CrNd, NiAl, NiTa, CrTiX, CrTaX, NiTaX, CoCrTaZrX, CoFeZrBCrX, CoTaZrX, CoFeTaZrX, CoCrWTaZrX, CoCrMoTaZrX, CoZrWMoX, and combinations thereof, where X may be selected from a group including $SiO_2$ and $ZrO_2$. According to an embodiment, the overcoat layer 212 may include diamond-like-carbon (DLC). According to an embodiment, the lubricant layer 214 may include a polymer-based material.

Method of Manufacturing Recording Media

Figure 3:
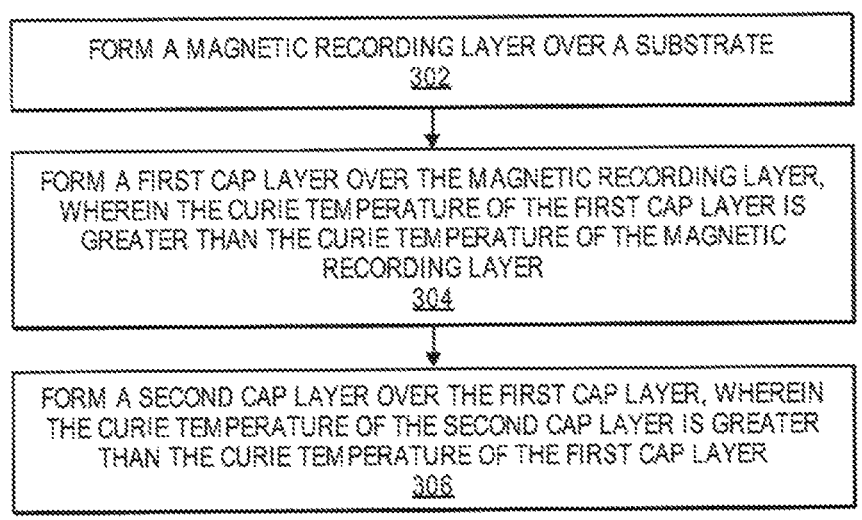
FIG. 3 is a flow diagram illustrating a method of manufacturing a recording medium, according to an embodiment.

Embodiments may be implemented in a HAMR hard disk drive including such HAMR media as media 200 (FIG. 2). FIG. 3 is a flow diagram illustrating a method of manufacturing a recording medium, according to an embodiment.

The media stack described herein can be fabricated, for example, using typical sputtering processes.

At block 302, a magnetic recording layer is formed over a substrate. For example, magnetic recording layer 208 (FIG. 2) is formed over substrate 202 (FIG. 2). As noted in reference to FIG. 2, an adhesion layer 204 and an intermediate layer 206 may also be fabricated over substrate 202 before forming the magnetic recording layer 208 thereover.

At block 304, a first cap layer is formed over the magnetic recording layer, where the Curie temperature ($T_c$) of the first cap layer material is greater than the Curie temperature ($T_c$) of the magnetic recording layer. For example, first cap layer 210 (FIG. 2) is formed (e.g., sputtered) directly on the magnetic recording layer 208. As with aforementioned embodiments, the first cap layer (e.g., first cap layer 210) formed at block 304 may comprise a hard magnetic material, $L1_0$ CoPt, CoPt having an amount of Pt in a range of 40-60 at %, $L1_0$ FePd, or hexagonal close-packed (hcp) $Co_3Pt$, according to embodiments.

At block 306, a second cap layer is formed over the first cap layer, where the Curie temperature ($T_c$) of the second cap layer material is greater than the Curie temperature ($T_c$) of the first cap layer. For example, second cap layer 211 (FIG. 2) is formed (e.g., sputtered) directly on the first cap layer 210. As with aforementioned embodiments, the second cap layer (e.g., second cap layer 211) formed at block 306 may comprise a soft magnetic material, generally, or may comprise or consist of Co, according to embodiments.

The deposition of layers can be performed using a variety of deposition sub-processes, for non-limiting examples, physical vapor deposition (PVD), sputter deposition and ion beam deposition, and chemical vapor deposition (CVD) including plasma enhanced chemical vapor deposition (PECVD), low pressure chemical vapor deposition (LP-CVD) and atomic layer chemical vapor deposition (AL-CVD). Furthermore, other suitable deposition techniques known in the art may also be used.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alpha-numeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A recording medium comprising:
   a substrate;
   a magnetic recording layer over said substrate;
   a first cap layer over said magnetic recording layer, wherein the Curie temperature of said first cap layer is greater than the Curie temperature of said magnetic recording layer; and
   a second cap layer over said first cap layer, wherein the Curie temperature of said second cap layer is greater than the Curie temperature of said first cap layer;
   wherein said first cap layer comprises a magnetically hard material and said second cap layer comprises a magnetically soft material.

2. The recording medium of claim 1, wherein said first cap layer comprises CoPt.

3. The recording medium of claim 1, wherein said first cap layer comprises CoPt having an amount of Pt in a range of 40-60 atomic percent.

4. The recording medium of claim 1, wherein said first cap layer comprises $L1_0$ CoPt.

5. The recording medium of claim 1, wherein said second cap layer consists of only Co.

6. The recording medium of claim 1, wherein said first cap layer comprises a material selected from a group consisting of $L1_0$ CoPt, $L1_0$ FePd, and hexagonal close-packed (hcp) $Co_3Pt$.

7. The recording medium of claim 1, wherein said first cap layer and said magnetic recording layer are configured to increase the anisotropy of said magnetic recording layer at a particular write temperature.

8. The recording medium of claim 1, comprising:
   an adhesion layer over said substrate;
   an intermediate layer over said adhesion layer, wherein said adhesion layer and said intermediate layer are below said magnetic recording layer;
   an overcoat layer over said cap layer; and
   a lubricant layer over said overcoat layer.

9. A data storage device comprising:
   a heat-assisted magnetic recording (HAMR) disk medium rotatably mounted on a spindle, said HAMR disk medium comprising:
   a substrate;
   a magnetic recording layer over said substrate;
   a magnetically hard cap layer over said magnetic recording layer, wherein the Curie temperature of said magnetically hard cap layer is greater than the Curie temperature of said magnetic recording layer; and
   a magnetically soft cap layer over said magnetically hard cap layer, wherein the Curie temperature of said magnetically soft cap layer is greater than the Curie temperature of said magnetically hard cap layer;
   a heat-assisted magnetic recording (HAMR) head slider comprising a read-write head configured to write to and read from said HAMR disk medium;
   a heat source thermally coupled with said slider; and a voice coil motor configured to move said HAMR head slider to access portions of said HAMR disk medium.

10. The data storage device of claim 9, wherein said magnetically hard cap layer comprises CoPt.

11. The data storage device of claim 9, wherein said magnetically hard cap layer comprises CoPt having an amount of Pt in a range of 40-60 atomic percent.

12. The data storage device of claim 9, wherein said magnetically hard cap layer comprises a material selected from a group consisting of $L1_0$ CoPt, $L1_0$ FePd, and hexagonal close-packed (hcp) $Co_3Pt$.

13. The data storage device of claim 9, wherein said magnetically soft cap layer comprises Co.

14. A method of manufacturing a recording medium, the method comprising:
  forming an adhesion layer over a substrate;
  forming an intermediate layer over said adhesion layer;
  forming a magnetic recording layer over said adhesion and said intermediate layers;
  forming a first cap layer over said magnetic recording layer, wherein the Curie temperature of said first cap layer is greater than the Curie temperature of said magnetic recording layer, thereby effectively increasing the magnetic anisotropy of said magnetic recording layer at a particular write temperature corresponding to said magnetic recording layer;
  forming a second cap layer over said first cap layer, wherein the Curie temperature of said second cap layer is greater than the Curie temperature of said first cap layer;
  forming an overcoat layer over said second cap layer; and
  forming a lubricant layer over said overcoat layer.

15. The method of claim 14, wherein forming said first cap layer comprises forming a cap layer comprising a magnetically hard material, and wherein forming said second cap layer comprises forming a cap layer comprising a magnetically soft material.

16. The method of claim 14, wherein forming said first cap layer comprises forming a cap layer comprising CoPt.

17. The method of claim 14, wherein forming said first cap layer comprises forming a cap layer comprising CoPt having an amount of Pt in a range of 40-60 atomic percent.

18. The method of claim 14, wherein forming said first cap layer comprises forming a cap layer comprising a material selected from a group consisting of $L1_0$ CoPt, $L1_0$ FePd, and hexagonal close-packed (hcp) $Co_3Pt$.

* * * * *